UNITED STATES PATENT OFFICE.

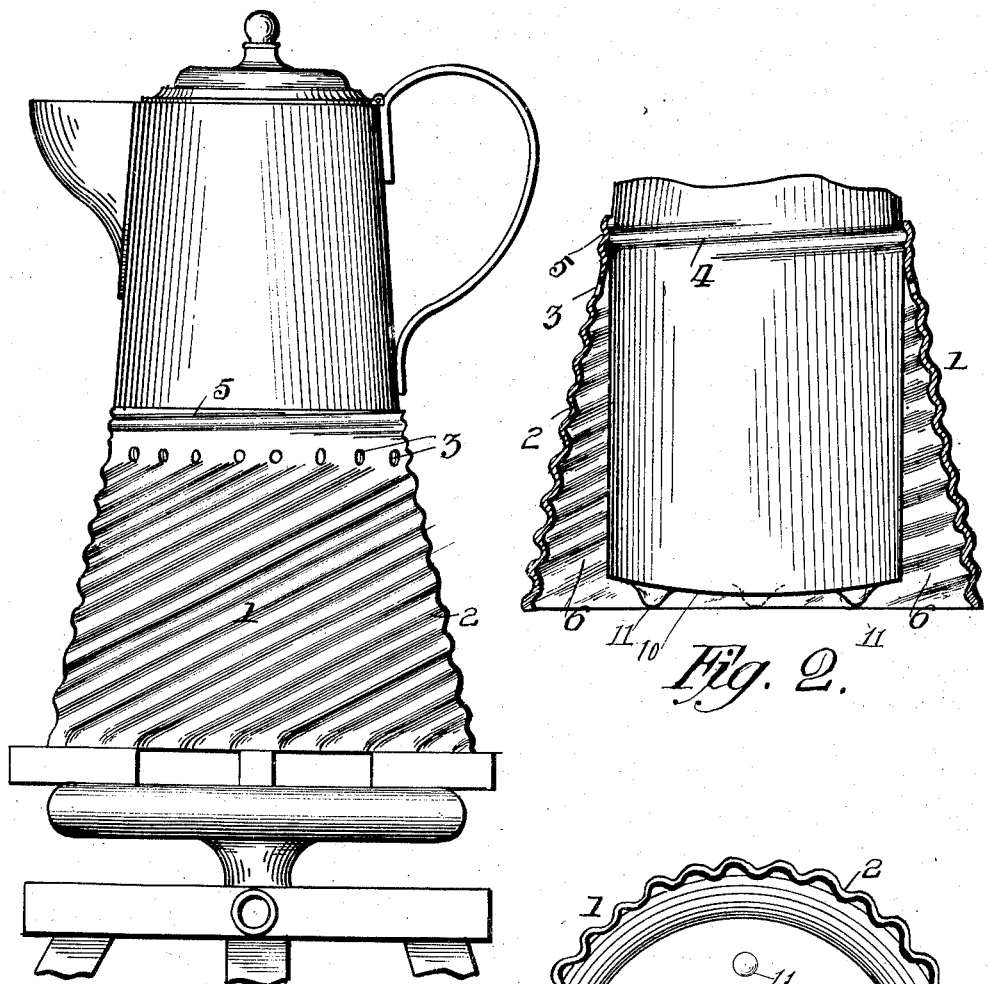

GEORGE W. TERHORST AND JOSEPH A. TERHORST, OF PITTSBURG, PENNSYLVANIA.

CULINARY VESSEL.

No. 878,908.  Specification of Letters Patent.  Patented Feb. 11, 1908.

Application filed December 9, 1904. Serial No. 236,253.

*To all whom it may concern:*

Be it known that we, GEORGE W. TERHORST and JOSEPH A. TERHORST, citizens of the United States of America, residing at Pittsburg, in the county of Allegheny and State of Pennsylvania, have invented certain new and useful Improvements in Culinary Vessels, of which the following is a specification, reference being had therein to the accompanying drawing.

This invention relates to culinary vessels, and more particularly to vessels adapted for heating liquids, such as coffee-pots, teapots, and like articles.

The object of the invention is to provide cooking vessels of the character indicated, with a simple and inexpensive attachment which will greatly facilitate the heating of the contents of the vessel, and which may be quickly applied to, and removed from, the exterior of the vessel.

The construction of the improvement will be fully described hereinafter in connection with the accompanying drawing which forms part of this specification, and its features of novelty will be defined in the appended claims.

In the drawing, Figure 1 is a side elevation of a coffee pot constructed in accordance with our invention, in position upon a suitable burner, Fig. 2 is a side elevation of a portion of the coffee-pot with its detachable hood shown in vertical section, and Fig. 3 is a bottom plan view of the coffee pot.

The reference numeral 1 designates a sheet metal hood, in the form of a hollow frustrated cone, said hood being corrugated to provide a series of spiral circumferentially-disposed grooves 2, on the inner surface of the hood. Adjacent to its upper end, the hood is formed with a circumferential row of openings 3. At a point about midway of its height, the coffee pot is formed with circumferentially-disposed screw threads 4, adapted to engage corresponding threads 5, formed at the upper end of the hood, above the row of openings 3. The conical construction of the hood provides an annular space 6 between the vessel and hood, for the circulation of heated air. The bottom 10 of the vessel is preferably of concavo-convex form to increase its heating surface, and depending from said bottom are a plurality of feet or lugs 11, the lower ends of which are in the horizontal plane of the lower edge of the hood.

It will be apparent that the conical hood confines the heat within the space 6, and the spirally disposed grooves 2 of said hood direct the heated air currents around the lower portion of the vessel.

The means shown for securing the hood to the coffee-pot or other vessel, are simple and effective, only a slight turning of the hood being required to connect or disconnect it.

The removability of the hood is a feature of advantage, permitting the vessel to be used with or without the hood as desired, and facilitating the packing and transporting of the vessels, and hoods, as the latter can be readily nested together.

The circumferential row of openings is adapted to create and maintain a draft for the currents of heated air within the hood.

What we claim as new and desire to secure by Letters Patent, is:—

A receptacle having spaced supports upon its bottom, and with external screw-threaded projections intermediate its ends, a flaring member having screw-threads at its upper smaller end adapted to engage the threads of the receptacle, and with its lower edge in transverse alinement with the terminals of said bottom support, and with a plurality of transverse apertures near its upper edge.

In testimony whereof we affix our signatures in the presence of two witnesses.

GEORGE W. TERHORST.
JOSEPH A. TERHORST.

Witnesses:
H. C. EVERT,
E. E. POTTER.